3,468,965
ALCOHOL PURIFICATION
Andrew O. Wikman, Baton Rouge, La., and Lawrence Rogovin, Cincinnati, Ohio, assignors to Ethyl Corporation, New York, N.Y., a corporation of Virginia
No Drawing. Filed Nov. 9, 1964, Ser. No. 409,968
Int. Cl. C07c *29/24, 31/00*
U.S. Cl. 260—643
9 Claims

ABSTRACT OF THE DISCLOSURE

In accordance with the teachings of the invention, a process is provided wherein synthetic alcohols produced through aluminum chemistry are contacted with a copper chromite type of catalyst in a hydrogen atmosphere at pressures lower than those normally employed in hydrogenation with that type catalyst and if desired are also contacted with a nickel catalyst under hydrogenation conditions to remove impurities which cause objectionable odors when the alcohols are sulfated.

---

This invention relates to the production of synthetic primary alcohols and in particular to the purification of alcohols having from 6–20 carbon atoms per molecule produced through aluminum chemistry.

In the production of synthetic primary alcohols such as lauryl alcohol and the like through processes involving aluminum chemistry in particular, the hydrolysis of aluminum alkoxides, as in U.S. Patent 2,892,858 a unique purity problem exists. These alcohols are prepared by the hydrolysis of aluminum alkoxide prepared by the oxidation of aluminum hydrocarbons containing a methylene radical bound to aluminum. This problem is not apparent in the alcohols themselves but manifests itself only upon subsequent treatment of the alcohols in certain utilization processes. Moreover, a particular subsequent treatment of the alcohols which is of interest (sulfation) converts the trace amounts of impurities present in these synthetic alcohols into entirely different materials which exhibit objectionable odor characteristics.

This odor problem is not experienced when naturally occurring lauryl alcohol is given the same sulfation treatment but apparently is unique to the aluminum chemistry product.

Early efforts to determine and correct the odor problem were largely unsuccessful because it is not possible to adequately determine by analytical procedures the nature of the impurities involved much less their exact identity. Contributing to the lack of adequate analytical procedures is the fact that the alcohols in question are not actually pure materials but rather are usually a mixture of alcohols such as lauryl or dodecyl alcohol, tetradecyl alcohol and hexadecyl alcohol totaling 99 percent or greater together with approximately 1 percent or less of impurities including paraffins and the like. Early in the investigations, however, it was possible to eliminate many identifiable impurities as possible odor sources. Typical of those eliminated were paraffins, aldehydes, olefins, epoxides, and unsaturated primary alcohols. It was recognized that ketones, esters and ethers possibly could provide odor contribution although not necessarily of the type of greatest concern, furthermore the quantities of such ketones, esters and ethers present in the alcohols were so minute as to dispel these materials from consideration. These materials were subsequently eliminated as potential precursors of the odoriferous materials by adding samples of them to a coolant derived (natural) lauryl range alcohol which was then given a standard sulfation treatment which had produced the objectionable odors with the synthetic lauryl range alcohol. All gave negative duplication results.

The sulfation treatment is represented by the following equations:

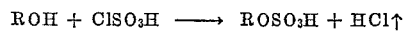

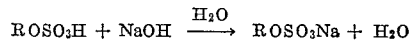

All known conventional techniques for purification of alcohols were tried and none was found that would reduce the odor problem to an acceptable level. Typical of these prior art purification processes tried were air blowing, heating with caustic, heating with 1 percent sulfuric acid, heating with potassium permanganate, heating with sodium methoxide, passage through charcoal, light topping, and even extended duration hydrogenation with nickel catalysts, a treatment ordinarily regarded as a highly effective clean-up procedure. Although some of the treatments listed did provide a noticeable reduction in the odor of the sulfated alcohol and were applied in so far as possible to the alcohol prior to sulfation as well as to the paste after sulfation, none of these techniques yielded a product considered acceptable in critical uses such as the production of certain non-perfumed detergent materials. In such non-perfumed applications a particularly critical problem exists since there is nothing available to mask undesirable odors which persist after the detergent utility has passed.

One difficulty that became apparent early in the efforts toward isolating the source and correcting the odor problem was that because of the extremely high purity of the alcohols involved it was virtually impossible to perform any manipulation except those of the mildest types without causing significant alcohol purity degradation regardless of whether or not any significant odor reduction resulted. The degradation was of several forms but in general it was of the nature of conversion of the alcohols into paraffins or esters or the introduction of other extraneous materials which had to be removed by other techniques, and the like. Thus it was recognized that the only purification processes which could be even considered as potential candidates were processes which could not involve such extremely rigorous treatment as oxidation, high temperature severe hydrogenation or the like.

As examination of the problem continued, speculation developed along the lines that in aluminum alkyl chemistry vinylidene olefin impurities could possibly contribute to the production of materials containing OH groups attached to internal carbon atoms of the molecule. Extensive speculation along this line did not appear encouraging because of the early elimination discoveries which indicated that secondary alcohols did not reproduce the odor problem. Nevertheless it was theorized that diols might exist, such as those of the 1,4 type, and that the sulfate treatment could possibly produce cyclization of such diols into furan ring type materials that might have the undesired odor.

It was discovered that samples of several 1,4 diols added to coconut derived lauryl range alcohol did in fact give rise to the objectionable odor upon sulfation. Analysis of the sulfated paste by VPC techniques displayed peaks corresponding to peaks previously noted in the sulfated synthetic alcohols but which had not been identifiable.

Once an indication was obtained as to the possible nature of the impurities involved it became necessary to find a technique for the removal of the materials which avoided serious alcohol degradation. Actual removal of the cyclized materials from the sulfated alcohol paste was not practical hence it was essential to concentrate upon techniques for removing the odor precursors from the synthetic alcohols themselves.

It was discovered that it appears possible to obtain in effect a selective removal of hydroxyl groups attached to internal carbon atoms, a selective dehydration, which could be performed under sufficiently mild conditions so as to avoid excessive product degradation. The conditions under which this selective dehydration occurred were such as to outwardly resemble hydrogenation conditions in some aspects however it is not a hydrogenation step and if removal of olefinic unsaturation is desired a mild hydrogenation appears necessary as a separate step which is conducted under different conditions.

In accordance with the teachings of the invention, a process is provided wherein synthetic alcohols produced through aluminum chemistry are contacted with a copper chromite type of catalyst in a hydrogen atmosphere at pressures lower than those normally employed in hydrogenation with that type catalyst and also are contacted with a nickel catalyst under hydrogenation conditions to remove impurities which cause objectionable odors when the alcohols are sulfated.

The process applies particularly to synthetic alcohols produced through aluminum chemistry involving chain growth from ethylene, oxidation of the aluminum trialkyl to alkoxide and hydrolysis of the alkoxide to the alcohol. As a result of this treatment the odor problem apparent upon sulfation of the alcohols has been solved.

Although an atomosphere of hydrogen is employed in the selective dehydration, it appears that this atmosphere is more of the nature of a means for shifting the equilibrium of the dehydration reaction or of spreading the reactivity of hydroxyl groups attached to internal carbon atoms in comparison to the reactivity of hydroxyl groups attached to terminal carbon atoms so as to in effect permit selectivity of removal of internal hydroxyl groups without destruction of the primary alcohols by also removing hydroxyl groups attached to terminal carbon atoms. The net result of this selective dehydration appears to be then that secondary alcohols are converted to olefins, diols of the 1,4 type are converted to unsaturated primary alcohols, and that diols having both hydroxyl groups attached to internal carbon atoms are converted to dienes. The important consideration here is that this is accomplished without large scale degradation or destruction of the primary alcohols. Regardless of whether or not the foregoing conversion theorization is rigorously correct, the result is that aluminum derived synthetic alcohols so treated exhibit vastly reduced odor when sulfated to a "lauryl" sulfate paste. Such materials can be used in the production of non-perfumed detergent materials in applications where the odor problem is critical and where coconut derived lauryl range alcohols are usable.

As a general proposition, the conditions under which the selective dehydration can be successfully performed involve a temperature from about 150 to about 300° C., preferably about 190° C. and a pressure of from about 100 to about 3000 p.s.i.a., preferably from 300–1000 p.s.i.a., such as 500 p.s.i.a. The reaction is conducted in a hydrogen atmosphere with a contact time in the reactor on a basis of cubic foot of liquid treated per hour per cubic foot of catalyst from about 0.1–4 preferably about 1.9. The catalyst is advantageously in the form of a fixed bed as well as in the form of a slurry depending upon the particular exigencies of the situation.

In a batch operation the catalyst may advantageously be in powder form so as to provide a slurry in the presence of agitation. A contact time of 90 minutes with ¼ of 1 percent catalyst gives excellent results. In general the contact time is related to catalyst concentration and a range from about 0.1 percent to about 10 percent has been found to give usable combinations of reaction time and catalyst expense.

The reaction is conducted in the presence of a mixed copper chromite catalyst which can be in the form of a mixture of copper oxide and chromium oxide having in effect approximately 41 percent chromium oxide, which proportion is here expressed for purposes of exemplification rather than limitation. The catalyst is preferably in particulate form such as powder, which is particularly advantageous in a catalyst circulation arrangement, or can be in the form of pellets of divers shapes such as cubes, spheres, tablets, cylinders, or the like, or various shape-size combinations, and may involve some suitable support or dispersant material of a more or less porous nature where it is desired to provide larger internal free space or pores to control physical conditions such as contact time, flow rate, or pressure drop. The catalyst can frequently be employed in admixture with or supported by clay type materials such as diatomaceous earth, alumina, silica and the like which may contribute additional desired catalytic activity. Fluidization to a greater or lesser extent for various purposes such as regeneration or so as to move at least in part with or in response to motion of the material being treated may be advantageous, such motion being introduced by conventional mechanisms such as circulation or agitation.

In general the limitations on ranges for conditions set forth in the foregoing represent those found to provide a desirable comprise between reaction rate and catalyst expense on the one hand and excessive product degradation on the other. For example as to the lower temperature limit, the enhanced freedom from product degradation at those temperatures is usually overbalanced by the attendant low reaction rate so as to make a temperature of about 150° a practical lower limit for a commercial process where substantial volumes must be handled. Conversely the enhanced reaction rates of the higher temperatures become offset by the more severe attendant product degradation in the form of excessive conversion of alcohols to paraffin, or increase in carbonyl and ester content, so that a practical upper limit for a commercial process is generally about 300° C. Similar considerations apply to other limits with the narrower ranges specified for the various conditions being preferable.

Regardless of how one selects operating conditions for the selective dehydration operation it is impossible to completely avoid product degradation. With operation under the preferred conditions however, the degradation is not unduly large for many uses of the alcohol products, but it may be undesirably large for certain critical uses. In any event it is probably so small as to be completely ignored by previous investigators. As indicated by the foregoing, the impurities in the product are generally paraffins, carbonyl materials and esters, together with unsaturates such as alcohols, olefins and dienes resulting from the removal of hydroxyl groups attached to internal carbon atoms. Although distillation is usually employed if the paraffins are excessive, it has been discovered that the impurities usually can be reduced to a substantial extent as regards esters and unsaturated alcohols resulting from the diols, by the combination with a hydrogenation treatment in a separate stage. This hydrogenation step of the process is conducted under entirely different conditions such as a temperature from about 100° C. to about 160° C., preferably about 125° C., a pressure of from about 100–1500 p.s.i.a., preferably about 500 p.s.i.a., with a hydrogen atmosphere and a supported nickel bed type catalyst such as nickel deposited on alumina or kieselguhr. The size of the catalyst particles will in general be determined on the basis of space velocity relationships in the rector and typically may be in the form of cubes, pellets, spheres, tablets, extrusions or the like having a size of the order of ⅛–¾″ depending upon the particular flow conditions convenient. Contact time in the reactor on a basis of cubic feet of liquid treated per hour per cubic foot of catalyst is from about 0.5 to about 15, preferably 1.

In batch operation a contact time of 90 minutes with a catalyst concentration of 2 percent provides particularly good results however a catalyst range of about 0.1 percent to about 10 percent is usable with corresponding contact time adjustment.

Example I

A high quality synthetic lauryl cut alcohol produced via hydrolysis of aluminium alkoxides containing approximately 65 parts dodecanol-1, 25 parts tetradecanol-1, and 10 parts hexadecanol-1, together with less than 1 percent mixed paraffins and trace amounts of impurities was "sulfated" with chlorosulphonic acid and neutralized with sodium hydroxide providing an aqueous sulfate paste of about 30 percent by weight concentration. A sensory examination of the odor level of this material was made by the panel as hereinafter described after the material was allowed to stand at room temperature for 12 hours. This material had an odor rating of 3 on a scale developed with the assistance of the next several examples.

Example II

For the purposes of establishing a high level odor reference, 2 parts hexane diol-1,4 was added to 1000 parts of coconut derived lauryl alcohol having the 65/25/10 ratio of the synthetic alcohol. The mixture was sulfated to a paste of similar 30 percent concentration as in Example I, and allowed to stand for 12 hours. This product upon panel testing gave a strong odor in excess of that detectable upon sulfation of typical high quality untreated synthetic alcohols produced by aluminum chemistry. This product was given an odor rating of 0.

Example III

Example II was repeated using 1 part hexane diol-1,4 added to 1000 parts of the coconut derived lauryl alcohol and the mixture was sulfated as before and odor tested. The resulting product had noticeably less odor than the material of Example II and was assigned an odor rating of 2.

Example IV

Example II was repated using 1 part hexane diol-1,4 added to 2000 parts coconut derived lauryl alcohol and the mixture sulfated to a paste and odor tested. Again a noticeable reduction in the odor was evident over the previous example and a material was obtained having an odor approximating that resulting with the high quality synthetic alcohol produced by aluminium chemistry of Example I. It was given the rating of 3.

Example V

Coconut derived (natural) lauryl alcohol without hexane diol additive was sulfated to a paste as in Example I. This material provided no detectable (objectionable) odor and was arbitrarily given an odor rating of 10.

Example VI

Example IV was repeated in a series of experiments using different percentages of diol added to the natural alcohol to provide distinguishable whole number levels between the previously set levels 3 and 10.

The foregoing odor determinations as well as those following were based on comparative olfactory "analyses" by a panel of 4 men and 4 women. Each determination by each member involved three samples, two of one material and one of the other. Determinations failing to correctly identify the identical samples of each group of 3 were discarded in setting the levels because they proved merely that the odor levels of the two materials were so close as to be indistinguishable by that panel member. If as many as three panel members were not thus set aside, it was concluded that a distinguishable difference existed. Chance was thus minimized. It was found that excellent reproducibility of results was obtainable after an initial brief period of adjustment.

For each of the following examples, Example I was repeated as to sulfation and odor determinations. The basic high quality alcohol of Example I was treated as indicated in the following prior to uniform sulfation. Odor determinations were on a uniform basis with results as noted in the following. The typical high quality alcohol in addition to having the 65/25/10 distribution and an odor rating of 3, had an iodine number of 0.05, a carbonyl number of 0.003, an ester value smaller than 0.05, and an acid value smaller than 0.02.

Example VII

The high quality alcohol was topped at 10 millimeters pressure in a 20 plate column at a 15:1 reflux ratio with 6.7 percent by volume of light ends and other materials being removed. The remainder was then flashed from 100–160° C. at 0.2 mm. pressure to give a superior quality alcohol. Upon sulfation as in Example I the odor rating was raised to 4, the iodine number was 0.08, the carbonyl number was 0.008, the ester value was less than 0.05, and the acid value was less than 0.003. The improvement although significant was still inadequate and indicated that at least as far as distillation was concerned the impurities were in the overall boiling range required to secure any significant amount of lauryl range alcohols.

Example VIII

Example I was repeated using the basic high quality alcohol which was carefully fractionated to yield a heart cut of each of the three alcohol components which cuts were then mixed in proper proportion to yield the same basic 65/25/10 distribution of dodecanol-1, tetradecanol-1, and hexadecanol-1, respectively as in the basic high quality alcohol. Upon sulfation this alcohol yielded an odor rating of 8 which was excellent however the expense involved in distillation and blending were so great as to be prohibitive in most large scale operations. Other characteristics of the heart cut mixture were iodine number 0.06, carbonyl number 0.001, ester value 0.07, acid value 0.01.

Example IX

Example I was repeated with the basic high quality alcohol which had been treated with copper chromite catalyst with the hydrogen atmosphere. This treatment involved heating at 175–183° C. with 1 part powdered copper chromite catalyst per 200 parts of alcohol under a hydrogen atmosphere at 500 p.s.i.a. pressure. Upon sulfation the odor rating was 6.5. The alcohol had an iodine number of 0.03, a carbonyl number of 0.033, an ester value of 0.29, and an acid value of 0.15.

Example X

Example IX was repeated using a temperature of 150° C. The odor rating upon sulfation was 6.5 as before, however, the iodine number was 0.07, the carbonyl number 0.003, the ester value was 0.15, the acid value was 0.13.

Example XI

Example IX was repeated using a temperature of 200° C. The odor rating upon sulfation was as before.

Example XII

Example IX was repeated using a temperature of 250° C. The odor rating upon sulfation was as before.

Example XIII

Example IX was repeated using a temperature of 300° C. The odor rating upon sulfation was as before.

Example XIV

Example IX was repeated using nickel catalyst with an atmosphere of hydrogen. Upon sulfation the odor rating of 3 was obtained showing that nickel hydrogenation did not materially improve the odor situation.

Example XV

Example I was repeated using the basic high quality alcohol employing several successive treatments. The first was with one part powdered copper chromite catalyst added per 100 parts of alcohol, at 200° C. and 100 p.s.i. hydrogen pressure in a stirred batch operation of 40 minutes duration. The alcohol was filtered and divided into two portions. The first portion was sulfated to a paste as in Example I. The odor rating was 6. The second portion was flashed and itself divided into two parts, a first being sulfated to a paste and received an odor rating of 5. The remaining flashed part of the second portion was topped removing approximately 15 percent by volume. Upon sulfation to a paste this sample was given an odor rating of 7. Although a significant odor improvement was obtained the ester value worsened materially. At the same time the iodine number rose to 0.59 compared to 0.05 for the untreated alcohol. In addition the acid value rose to 0.24 in comparison to the value of 0.02 for the untreated alcohol.

Example XVI

Example XV was repeated using a hydrogenation treatment with nickel catalyst as in Example XIV preceding the copper chromite treatment. Upon sulfation the odor rating was the same, however, being assigned the 7 level. The treated alcohol had an iodine number of 0.02, a carbonyl number of 0.005, an ester value less than 0.05, and an acid value of 0.22.

Example XVII

Example XVI was repeated reversing the order of catalyst treatment so that the first treatment was with copper chromite, the second was hydrogenation with nickel catalyst. Upon sulfation the product had an extremely low odor level which was classed as 8. In addition this alcohol had an iodine number of 0.04, a carbonyl number of 0.007, an ester value of 0.25, and an acid value of 0.12.

Example XVIII

Example XVII was repeated with topping and flashing as in Example VII prior to the copper chromite treatment. No noticeable improvement was obtained.

Example XIX

Example XVII was repeated using a chromite catalyst (33 percent $Cr_2O_3$ on a silicated alumina base) in place of the copper-chromite catalyst. Results were similar, however, the ester value was significantly lower being less than 0.1 and the acid value was less than 0.1.

What is claimed is:

1. A process for purifying alcoholic materials produced by hydrolysis of aluminum alkoxides prepared by the oxidation of aluminum hydrocarbons containing a methylene radical bound to aluminum to reduce contamination by diols comprising, treating materials consisting essentially of said alcoholic materials with copper chromite catalyst under a hydrogen atmosphere at a temperature from about 150° to about 300° C. and a pressure of from about 20 to about 70 atmospheres.

2. The process of claim 1 wherein the treating temperature is from about 150° to about 190° C. and the pressure is from about 20 to about 35 atmospheres.

3. The process of claim 1 wherein the treating temperature is from about 175° to about 200° C. and the pressure is from about 20 to about 70 atmospheres.

4. The process of claim 1 wherein the treating temperature is from about 175° to about 200° C. and the pressure is about 500 p.s.i.a.

5. A process for purifying alcoholic materials produced by hydrolysis of aluminum alkoxides prepared by the oxidation of a aluminum hydrocarbons containing a methylene radical bound to aluminum to reduce contamination by diols comprising, treating materials consisting essentially of said alcoholic materials with chromite silicated alumina catalyst under a hydrogen atmosphere at a temperature from about 150° C. to about 190° C. and a pressure of from about 20 to 35 atmospheres.

6. A process for purifying alcoholic materials produced by hydrolysis of aluminum alkoxides prepared by the oxidation of aluminum hydrocarbons containing a methylene radical bound to aluminum comprising, treating materials consisting essentially of said alcoholic materials with copper chromite catalyst under a hydrogen atmosphere at a temperature from about 150° to about 300° C. and a pressure from about 20 to about 200 atmospheres, and then hydrogenating the so-treated materials with a nickel catalyst at a temperature from about 100° C. to about 160° C. and a pressure from about 100 to about 1500 p.s.i.a.

7. The process of claim 6 wherein the temperature of the treating step is from about 175° to about 200° C. and the pressure is from about 20 to about 70 atmospheres.

8. The process of claim 6 wherein the temperature of the treating step is from about 150° to about 190° C. and the pressure is from about 20 to about 35 atmospheres.

9. The process of claim 6 wherein the temperature of the treating step is from about 175° to about 200° C. with a pressure of about 500 p.s.i.a. and the temperature of the hydrogenating step is about 125° C. with a pressure of about 500 p.s.i.a.

References Cited

UNITED STATES PATENTS

| | | | |
|---|---|---|---|
| 1,963,998 | 6/1934 | Larcher. | |
| 1,964,000 | 6/1934 | Lazier | 260—642 |
| 2,086,713 | 7/1937 | Grun | 260—642 |
| 2,454,936 | 11/1948 | Morey | 260—642 |
| 2,569,671 | 10/1951 | Hughes et al. | 260—643 |
| 2,775,623 | 12/1956 | Bell | 260—643 |
| 2,836,628 | 5/1958 | Miller | 260—642 |
| 3,173,959 | 3/1965 | Richmuster. | |
| 3,288,866 | 11/1966 | Cooper | 260—638 |
| 3,296,318 | 1/1967 | Starks | 260—643 |

FOREIGN PATENTS 929,325  6/1963  Great Britain.

LEON ZITVER, Primary Examiner

J. E. EVANS, Assistant Examiner

U.S. Cl. X.R.

260—642, 681, 682

UNITED STATES PATENT OFFICE
CERTIFICATE OF CORRECTION

Patent No. 3,468,965                September 23, 1969

Andrew O. Wikman et al.

It is certified that error appears in the above identified patent and that said Letters Patent are hereby corrected as shown below:

In the heading to the printed specification, lines 4 and 5, "assignors to Ethyl Corporation, New York, N. Y., a corporation of Virginia" should read -- assignors of one-half each to Ethyl Corporation, Richmond, Va., a corporation of Virginia, and The Proctor & Gamble Company, Cincinnati, Ohio, a corporation of Ohio --. Column 1, line 70, "coolant" should read -- coconut --. Column 4, line 68, "rector" should read -- reactor --.

Signed and sealed this 26th day of May 1970.

(SEAL)
Attest:

EDWARD M. FLETCHER, JR.            WILLIAM E. SCHUYLER, JR.
Attesting Officer                 Commissioner of Patents